(12) United States Patent
Georgiou et al.

(10) Patent No.: US 11,327,307 B2
(45) Date of Patent: May 10, 2022

(54) NEAR-EYE PERIPHERAL DISPLAY DEVICE

(71) Applicant: Microsoft Technology Licensing, LLC, Redmond, WA (US)

(72) Inventors: Andreas Georgiou, Cambridge (GB); Joel Steven Kollin, Seattle, WA (US); Bernard Charles Kress, Redwood City, CA (US); Alfonsus D. Lunardhi, San Ramon, CA (US); Sohaib Abdul Rehman, Cambridge (GB); Charles Thomas Hewitt, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 16/403,148

(22) Filed: May 3, 2019

(65) Prior Publication Data
US 2020/0348518 A1 Nov. 5, 2020

(51) Int. Cl.
*G02B 27/01* (2006.01)
*G02B 17/08* (2006.01)
*G06F 3/01* (2006.01)

(52) U.S. Cl.
CPC ..... *G02B 27/0172* (2013.01); *G02B 17/0856* (2013.01); *G06F 3/011* (2013.01); *G02B 2027/0123* (2013.01); *G02B 2027/0134* (2013.01); *G02B 2027/0147* (2013.01); *G02B 2027/0178* (2013.01)

(58) Field of Classification Search
CPC G02B 27/01; G02B 27/0172; G02B 27/0101; G02B 27/017; G02B 27/0103; G02B 17/08; G02B 17/0856; G02B 2027/0123; G02B 2027/0134; G02B 2027/0147; G02B 2027/0178; G02B 2027/014; G02B 6/005; G02B 6/0076; G02B 6/0078; G06F 3/01; G06F 3/011; G06F 3/013
USPC ........... 359/732, 13, 630, 631, 633; 345/7, 8
See application file for complete search history.

(56) References Cited

U.S. PATENT DOCUMENTS

| 6,215,593 | B1 | 4/2001 | Bruce |
| 10,127,727 | B1 | 11/2018 | Yuan et al. |
| 2008/0106489 | A1 | 5/2008 | Brown et al. |
| 2014/0364209 | A1 | 12/2014 | Perry |
| 2017/0357089 | A1 | 12/2017 | Tervo et al. |
| 2018/0203231 | A1 | 7/2018 | Glik et al. |

OTHER PUBLICATIONS

"LetinAR", Retrieved from: https://letinar.com/technology/, Retrieved Date: Feb. 27, 2019, 3 Pages.
"Limbak", Retrieved from: https://web.archive.org/web/20160901154006/http:/www.limbak.com/technology/, Sep. 1, 2016, 2 Pages.
"LusoVu", Retrieved from: https://web.archive.org/web/20140620053728/http:/www.lusovu.com/#/homepage, Jun. 20, 2014, 13 Pages.

(Continued)

*Primary Examiner* — Jie Lei
(74) *Attorney, Agent, or Firm* — Alleman Hall Creasman & Tuttle LLP

(57) ABSTRACT

A head-mounted, near-eye display device includes a central display and a peripheral display. The central display creates a central image of a first resolution in a central eyebox. The peripheral display creates a peripheral image of a second resolution, lower than the first resolution, in a peripheral eyebox, different than the central eyebox.

19 Claims, 9 Drawing Sheets

(56) References Cited

OTHER PUBLICATIONS

Dunn, et al., "Wide Field of View Varifocal Near-Eye Display Using See-Through Deformable Membrane Mirrors", In Journal of IEEE Transactions on Visualization and Computer Graphics, vol. 23, Issue 4, Apr. 2017, pp. 1275-1284.

Lanman, et al., "Near-Eye Light Field Displays", In Journal of ACM Transactions on Graphics, vol. 36, Issue 6, Nov. 2013, 10 Pages.

Okaichi, et al., "Continuous combination of viewing zones in integral three-dimensional display using multiple projectors", In Journal of Optical Engineering, vol. 57, Issue 6, Mar. 14, 2018, 19 Pages.

Orlosky, et al., "Fisheye Vision: Peripheral Spatial Compression for Improved Field of View in Head Mounted Displays", In Proceedings of 2nd ACM Symposium on Spatial User Interaction, Oct. 4, 2014, 8 Pages.

Rakkolainen, et al., "A Superwide-FOV optical design for head-mounted displays", In Proceedings of 26th International Conference on Artificial Reality and Telexistence and the 21st Eurographics Symposium on Virtual Environments, Oct. 7, 2016, 4 Pages.

Yang, et al., "Method of achieving a wide field-of-view head-mounted display with small distortion", In Journal of Optics Letters, vol. 38, Issue 12, Jun. 15, 2013, pp. 2035-2037.

"International Search Report and Written Opinion Issued in PCT Application No. PCT/US20/026975", dated Sep. 11, 2020, 15 Pages.

From $-C_{max}°$ to $P_{min}°$: only central display
From $P_{min}°$ to $C_{max}°$: overlap both displays
From $C_{max}°$ to $P_{max}°$: only peripheral though the example of FIG. 1. In other examples, the wearable electronic device
NEAR-EYE PERIPHERAL DISPLAY DEVICE

BACKGROUND

Implemented primarily in head-worn display devices, near-eye display technology enables 3D stereo vision and virtual reality (VR) presentation. When implemented with see-through optics, it enables a mixed reality (MR), in which VR elements are admixed into the user's natural field of view. Despite the potential of truly immersive virtual and mixed realities, near-eye display technology faces numerous technical challenges. Such challenges include achieving a wide field of view (FOV) and high angular resolution in a small form factor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted, near-eye display device includes a central display and a peripheral display. The central display creates a central image of a first resolution in a central eyebox. The peripheral display creates a peripheral image of a second resolution, lower than the first resolution, in a peripheral eyebox, different than the central eyebox.

DETAILED DESCRIPTION

Figure 1:
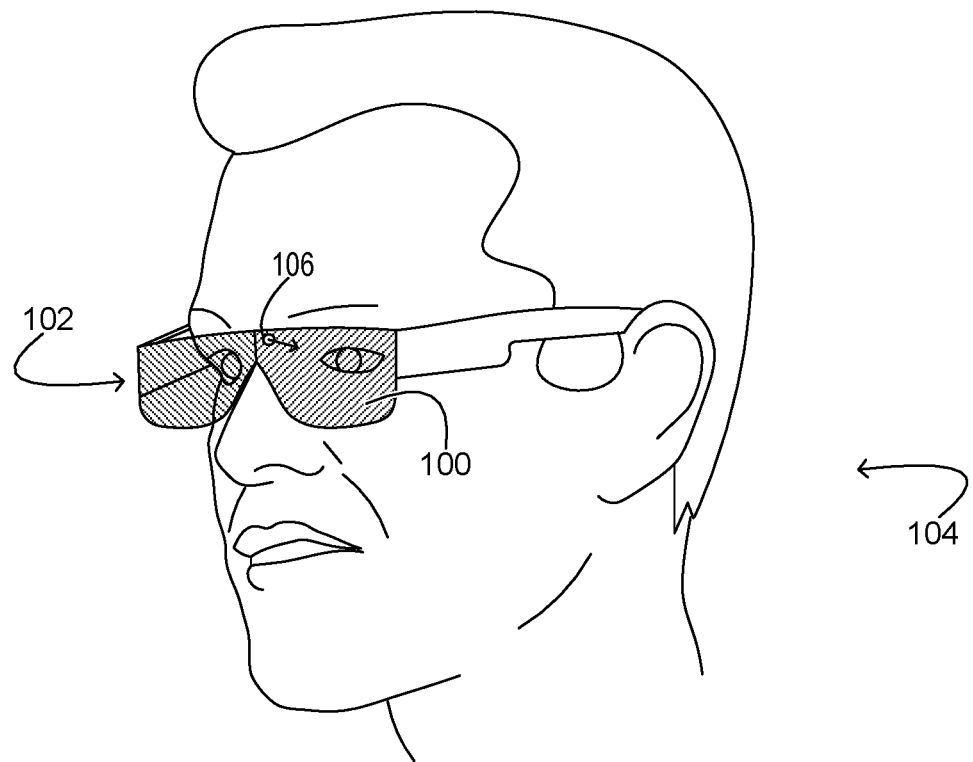
FIG. 1 shows aspects of an example implementation environment for a near-eye display system.

Based on state of the art technology, head-mounted devices (HMDs) having a near-eye display with a small field of view (FOV) (e.g., 30~60 degrees) have better optical characteristics—in terms of modulation transfer function (MTF)/optical quality, contrast, form factor, etc.—relative to a conventional near-eye display having a larger field of view. However, an HMD having a near-eye display with a large FOV may be desirable for some applications. Prior attempts to provide a large FOV have resulted in HMDs with large and bulky optics having poor performance and angular resolution.

Accordingly, the present disclosure is directed to a head-mounted, near-eye display device having a wide FOV and a high perceived angular resolution. Such a head-mounted, near-eye display device includes a central display and a peripheral display. The central display may provide a central horizontal field of view. The peripheral display may provide a peripheral horizontal field of view that overlaps the central horizontal field of view.

In some implementations, the central display creates a central image of a first resolution in a central eyebox and the peripheral display creates a peripheral image of a second resolution, lower than the first resolution, in a peripheral eyebox, different than the central eyebox. Such a head-mounted, near-eye display device may be configured to form a combined image having a varied resolution that is distributed in a manner that mimics the perceptive field of the human eye. In other words, by positioning a higher-resolution image "on-axis" in the central eyebox and positioning a lower-resolution image in the peripheral eyebox, the combined image may be perceived by a user as having higher quality, since the lower-resolution image is positioned where the perceptive power of the eye is lower.

Furthermore, an average user is generally comfortable moving their eyes within a central viewing region (e.g., +/−15°) to view an object. If an object is in a peripheral viewing region that is outside of the central viewing region, then the average user is likely to rotate their head until the object is within the central viewing region. In some implementations, the central display may be configured to have a horizontal field of view that is wider than the central viewing region of an average human, such that the user of the head-mounted, near-eye display device may view higher-resolution imagery provided by the central display for most of the user's viewing experience.

In some examples, the display optical architecture of the present disclosure may be implemented as a peripheral display for a foveated central display, either in a see-through (e.g., augmented-reality (AR)) or opaque (virtual-reality (VR)) immersive display architecture. In other examples, the display optical architecture may span then entire FOV as the primary display architecture. This optical display architecture is able to synthetically build up a total FOV from a plurality of partial FOVs, an eyebox from a plurality of partial exit pupils, and an angular resolution (even foveated) from a static uniform display. This display optical architecture may be implemented across a continuum of optical display architectures that include a traditional single lens, multipath dual or quadruple lenses, and an array of lenses (e.g., light field display).

FIG. 1 shows aspects of an example implementation environment for a near-eye display system 100. As illustrated herein, near-eye display system 100 is a component of a head-mounted electronic device 102, which is worn and operated by a user 104. The near-eye display system 100 is configured to present virtual imagery in the user's field of view. In some implementations, user-input componentry of the wearable electronic device 104 may enable the user to interact with the virtual imagery. The wearable electronic device 102 takes the form of eyeglasses in the example of FIG. 1. In other examples, the wearable electronic device 102 may take the form of goggles, a helmet, or a visor. In still other examples, the near-eye display system 100 may be a component of a non-wearable electronic device.

The near-eye display system 100 may be configured to cover one or both eyes of the user 104 and may be adapted for monocular or binocular image display. In examples in which the near-eye display system 100 covers only one eye, but binocular image display is desired, a complementary near-eye display system may be arranged over the other eye. In examples in which the near-eye display system covers both eyes and binocular image display is desired, the virtual imagery presented by near-eye display system 100 may be divided into right and left portions directed to the right and left eyes, respectively. In scenarios in which stereoscopic image display is desired, the virtual imagery from the right and left portions, or complementary near-eye display systems, may be configured with appropriate stereo disparity so as to present a three-dimensional subject or scene.

The near-eye display system 100 optionally may include a gaze-tracking sensor 106 configured to track a current position of a feature of an eye of the user 104. The tracked position of the feature of the eye may be used to derive an eye gaze position. For example, the gaze-tracking sensor 106 may include a light source that projects light onto the wearer's eye, and the gaze-tracking sensor 106 may include an image sensor that captures light reflected from a cornea of the user's eye with which glints and/or other features can be identified to determine the position of the tracked feature. In some examples, the gaze-tracking sensor 106 may be configured to determine a diameter and/or perimeter of a feature of the eye. The gaze-tracking sensor 106 may be configured to determine the position of any suitable feature of the wearer's eye. Further, the gaze-tracking sensor 106 may employ any suitable eye gaze tracking technology. In some examples, the gaze-tracking sensor 106 may be configured to independently track features in each of the user's eyes. In some implementations, at least some portions of the near-eye display system 100 may be selectively powered based on an eye gaze position detected by the gaze-tracking sensor 106.

Figure 2A:
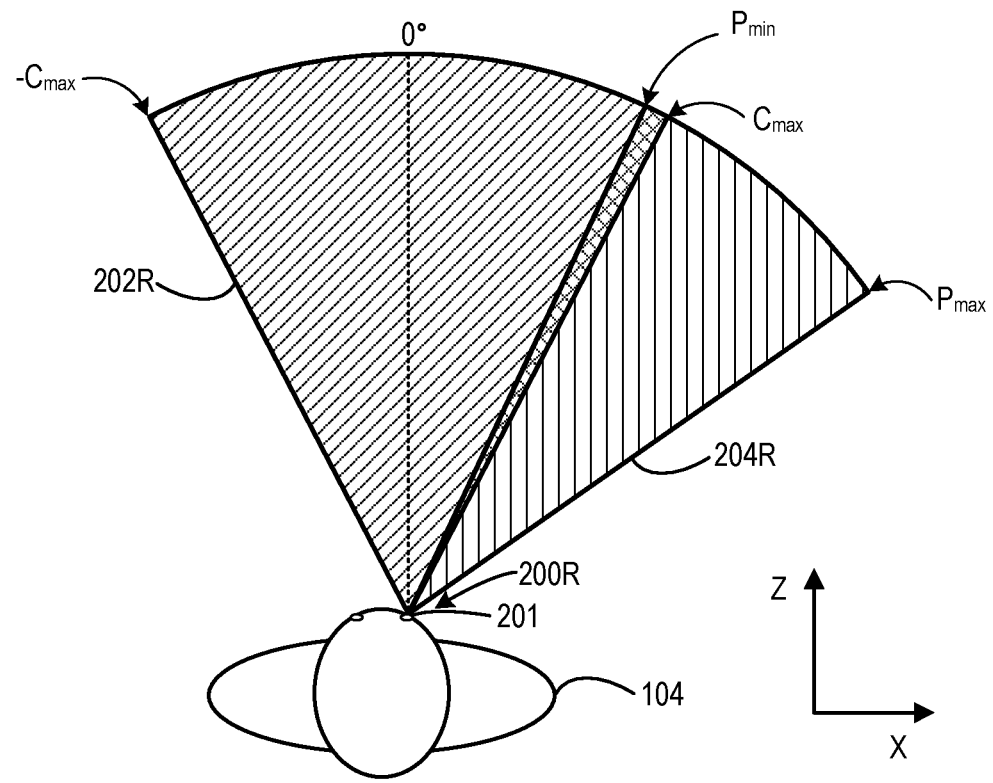
FIG. 2A shows additional aspects of example right-eye, near-eye display system.
Figure 2B:
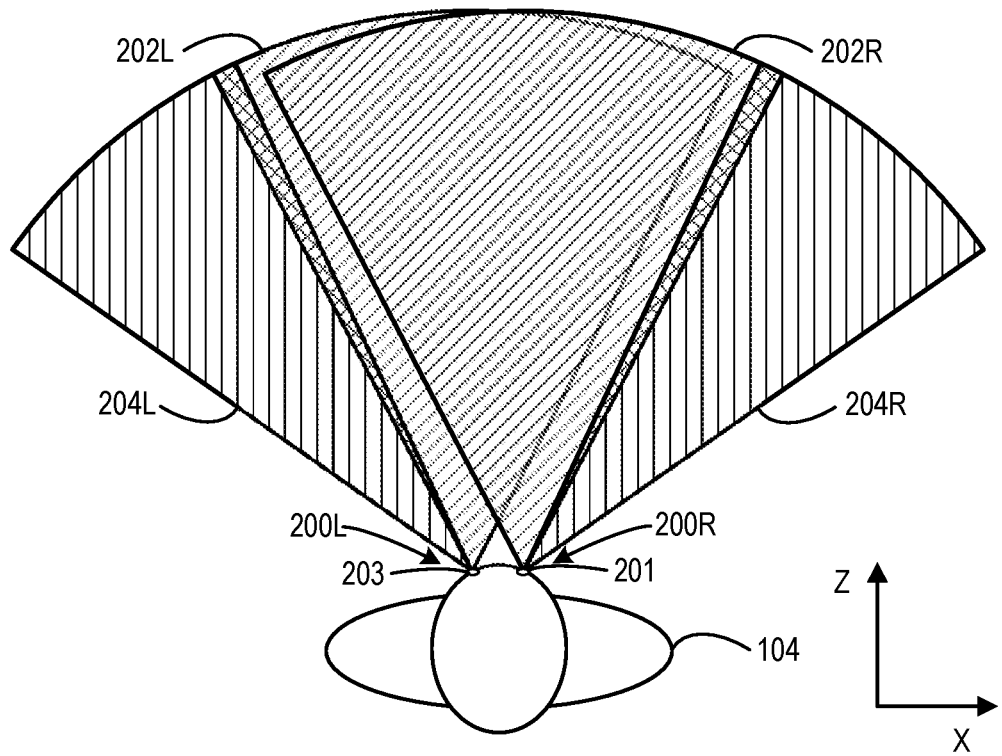
FIG. 2B shows additional aspects of example right-eye and left-eye, near-eye display systems.

As discussed above, in order to create a larger field of view, the head-mounted electronic device 102 shown in FIG. 1 may include a plurality of near-eye displays cooperatively configured to provide virtual imagery to each eye of the user 104. FIGS. 2A and 2B schematically show an expanded field of view cooperatively created by central and peripheral near-eye displays in the head-mounted electronic device 102 shown in FIG. 1. In particular, FIG. 2A shows an overhead view of horizontal fields of view provided by different cooperating displays of an example right-eye, near-eye display system 200R for a right eye 201 of the user 104. The right-eye, near-eye display system 200R includes a central display having a central horizontal field of view 202R and a peripheral display having a peripheral horizontal field of view 204R. In the depicted example, the central horizontal field of view 202R and the peripheral horizontal field of view 204R cooperatively provide a total field of view for the right eye 201 of the user 104. In other examples, the right-eye, near-eye display system 200R may include more than two displays that cooperatively provide the total field of view for the right eye of the user 104.

The central horizontal field of view 202R optionally may be positioned "on-axis"/centered on the right eye 201 of the user 104 at 0° (in relation to an optical axis of the right eye). The central horizontal field of view 202R may be from $-C_{max}°$ to $C_{max}°$. In the illustrated example, $-C_{max}°$ is $-27.5°$, and $C_{max}°$ is $27.5°$. In another example, $-C_{max}°$ may be less than or equal to $-20°$, and $C_{max}°$ may be greater than or equal to $20°$. Note that the angles and angular ranges discussed herein are defined in terms of rotation away from 0° where clockwise rotation is positive and counter-clockwise rotation is negative. In other examples, the central display may have a central horizontal field of view having a different angular range relative to the optical axis of the right eye 201 of the user 104. In some examples, the horizontal field of view will not be centered around the optical axis.

The peripheral display may provide a peripheral horizontal field of view 204R from $P_{min}°$ to $P_{max}°$. In the illustrated example, $C_{max}°$ is greater than $P_{min}°$, such that the peripheral horizontal field of view 204R overlaps the central horizontal field of view 202R in the angular region from $P_{min}°$ to $C_{max}°$. In the illustrated example, $P_{min}°$ is 25° and $P_{max}°$ is 55°. In another example, $P_{min}°$ may be less than 20° (e.g., 15°) and $P_{max}°$ may be at least 50°. In other examples, the peripheral display may have a peripheral horizontal field of view having a different angular range relative to the optical axis of the right eye 201 of the user 104.

In some implementations, the central display may be configured to create a central image having a first resolution and the peripheral display may be configured to create a peripheral image having a second resolution lower than the first resolution of the central image. The central image and the peripheral image may form a combined image having a varied resolution that is distributed in a manner that mimics the perceptive field of the human eye.

FIG. 2B shows the right-eye, near-eye display system 200R and a complimentary, left-eye, near-eye display system 200L for a left eye 203 of the user 104. The left-eye, near-eye display system 200L may be configured in a similar manner as the right-eye, near-eye display system 200R and may be arranged over the left eye 203 of the user 104. As can be seen, the central horizontal fields of view 202R and 202L overlap, thus allowing for binocular, three-dimensional display in the overlapping region. The peripheral horizontal field of view 204R is visible to only the right eye, and the peripheral horizontal field of view 204L is visible to only the left eye.

In some implementations, the central displays of the near-eye display systems 200R and 200L each may be configured to create a central image having a first resolution. The peripheral displays of the near-eye display systems 200R and 200L each may be configured to create a peripheral image having a second resolution lower than the first resolution of the central image. The central images and the peripheral images may form a combined image having a varied resolution that is distributed in a manner that mimics the perceptive field of the human eye.

In each of the near-eye display systems 200R and 200L, the central horizontal field of view 202 and the peripheral horizontal field of view 204 may overlap so that there is no dead space in the eyebox when the user's gaze (e.g., pupil) moves around. In this way, the central display and peripheral display may collectively provide virtual imagery that may be perceived by the user as being seamless even when the user's gaze moves around within the overall field of view.

Figure 3:
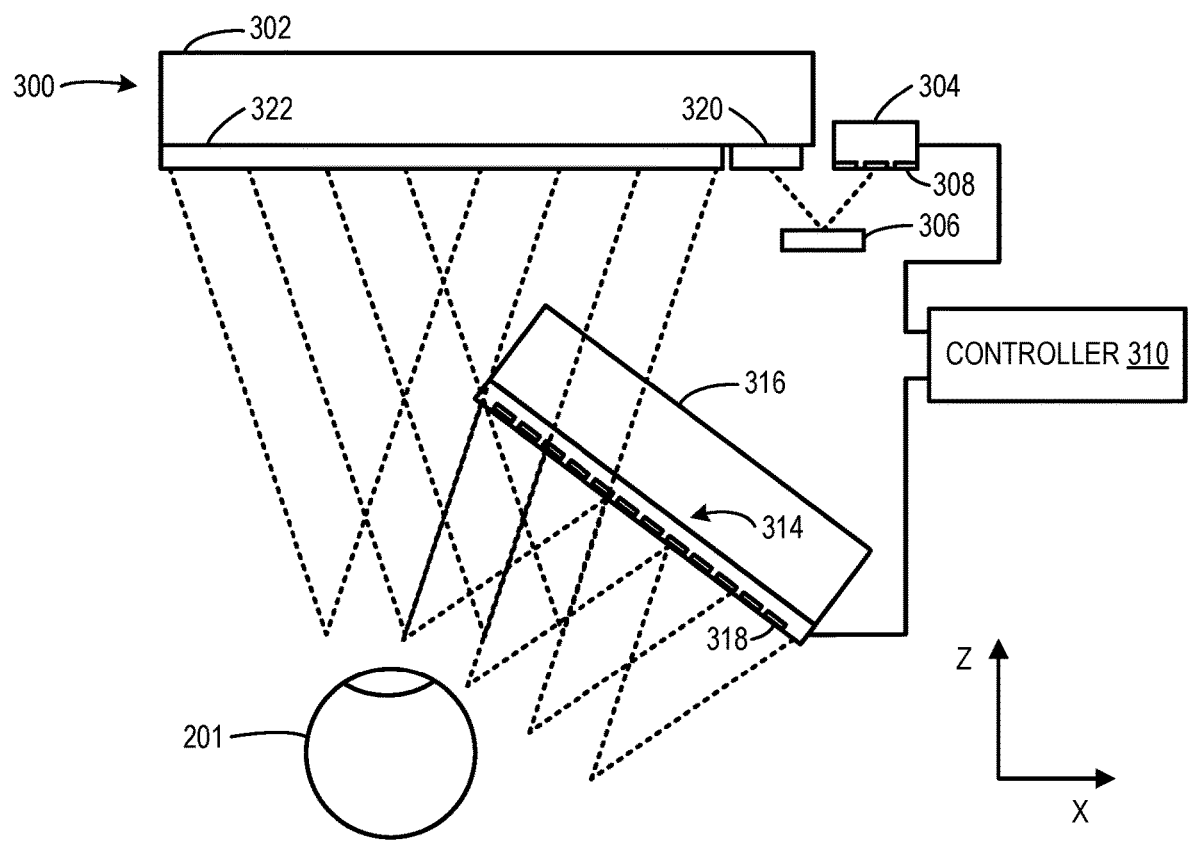
FIG. 3 schematically shows an example near-eye display system including a central display and a transmissive peripheral display.
Figure 4:
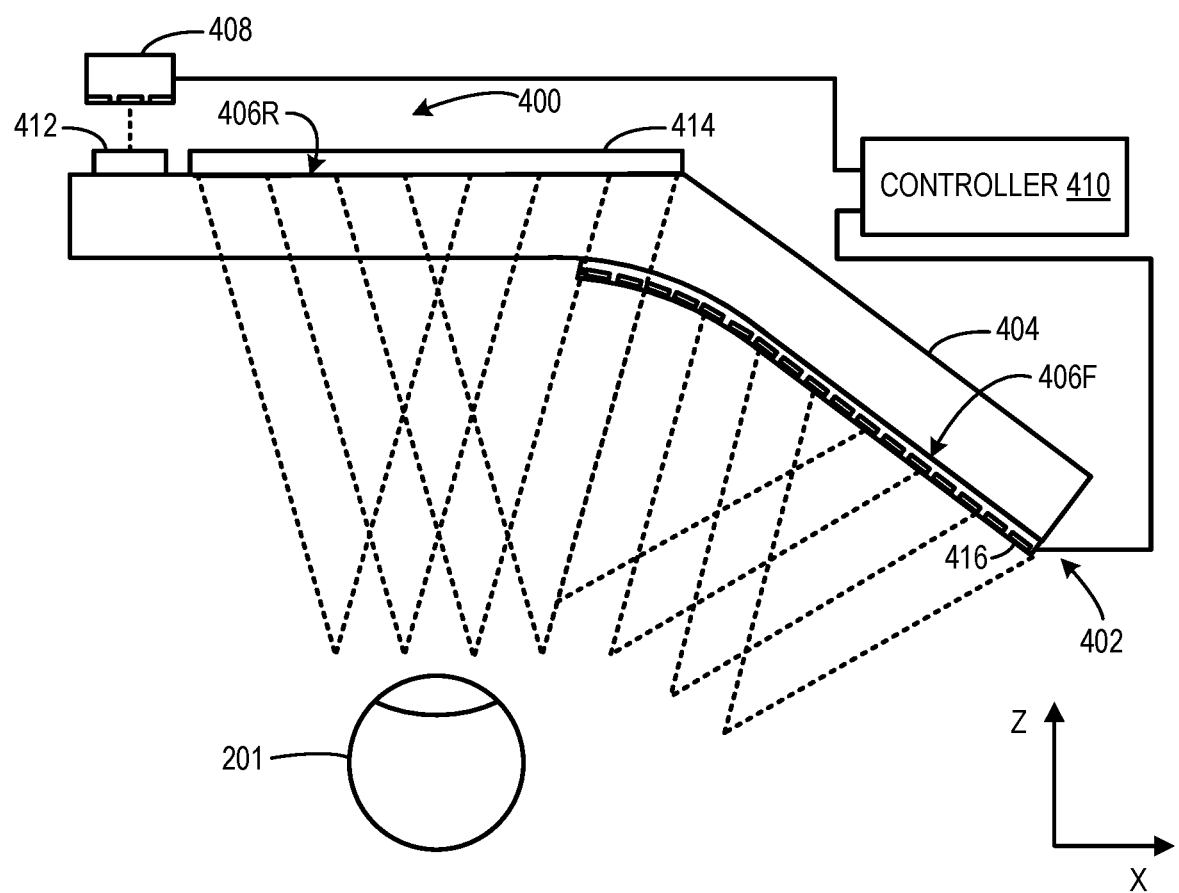
FIG. 4 schematically shows an example near-eye display system including a central display and a curved, transmissive peripheral display coupled to a common waveguide.

To accommodate the overlapping fields of view provided by the central display and the peripheral display, at least one of the central display and the peripheral display may be a see-through display. FIGS. 3 and 4 schematically show different example display arrangements that may be implemented in a near-eye display system, such as the right-eye, near-eye display system 200R shown in FIGS. 2A and 2B.

In FIG. 3, a central display 300 includes a central waveguide 302. A display projector 304 is configured to emit display light that is directed into the central waveguide 302. The display projector 304 includes a high-resolution spatial light modulator (SLM) 306 illuminated by one or more light emitters 308. The light emitters 308 may comprise light-emitting diodes (LEDs) or laser diodes, and the SLM 306 may comprise a liquid-crystal-on-silicon (LCOS) or digital micromirror array, for example. The SLM 306 and the light emitters 308 of the display projector 304 are coupled operatively to controller 310. The controller 310 controls the matrix of independent, light-directing pixel elements of the SLM 306 so as to cause the SLM 306 to modulate the light received from the light emitters 308 and thereby form the desired display image. By controlling the light modulation temporally as well as spatially, the controller 310 may cause the display projector 304 to project a synchronized sequence of display images (i.e., video). In the depicted example, the display image is formed by reflection from the SLM 306. In other examples, a display image may be formed by transmission through a suitably configured, transmissive SLM. Display projectors based on other technologies are also envisaged—organic LED arrays, raster-scanning laser beams, etc. The light output from the display projector 304 may be substantially monochromatic or multi-color (e.g., red, green, blue). In some examples that utilize multi-color light, the display projector 304 may perform color field-sequential display.

The central waveguide 302 includes an entry grating 320 and an exit grating 322. Entry grating 320 is a diffractive structure configured to receive the display light and to couple the display light into the central waveguide 302. After coupling into the central waveguide 302, the display light propagates through the central waveguide 302 by total internal reflection (TIR) from front and rear faces of the central waveguide. Exit grating 322 is a diffractive structure configured to controllably release the propagating display light from the central waveguide 302 in the direction of the user's eye 201 to create the central eyebox. The display light may converge toward a focal point that lies before, within, or beyond the human eye 201. In some examples, the exit pupil formed may coincide with a human eye pupil. Light entering the human eye pupil may be focused by the eye lens to modify the light's focal point, for example to focus the light at the retinas. When light is stereoscopically projected toward retinas of both eyes at once, the resulting virtual imagery may be perceived as a three-dimensional object that appears to exist at a three-dimensional position within the user's environment, some distance away from the user.

Furthermore, a peripheral display 314 is coupled to a peripheral waveguide 316 separate from the central waveguide 302. The peripheral display 314 and the peripheral waveguide 316 are positioned at least partially in front of the central display 300. The peripheral display 314 and the peripheral waveguide 316 are see-through such that display light emitted from the central display 300 is transmitted through the peripheral waveguide 316 and the peripheral display 314 to the user's eye 201. The see-through peripheral display 314 includes an array of light emitting diodes (LEDs) 318 on a transparent substrate. The LED array may be controlled by the controller 310 to emit display light. An array of reflective lenses may be coupled to the array of LEDs 318 and configured to reflect the display light emitted from LEDs the toward the user's eye 201 to create a peripheral eyebox. The controller 310 may control the central display 300 and the peripheral display 314 to cooperatively provide virtual imagery to the user's eye 201. Using separate waveguides for the central and peripheral displays in such a near-eye display system may allow for greater design flexibility, but also increased device complexity.

In some implementations, the central display 300 may be configured to create a central image of a first resolution in a central eyebox and the peripheral display 314 may be configured to create a peripheral image of a second resolution, lower than the first resolution, in a peripheral eyebox, different than the central eyebox. The central image and the peripheral image may form a combined image having a varied resolution that is distributed in a manner that mimics the perceptive field of the human eye. In other words, by positioning a higher-resolution image "on-axis" in the central eyebox and positioning a lower-resolution image in the peripheral eyebox, the combined image may be perceived by a user as being of higher quality, since the lower-resolution image is positioned where the perceptive power of the eye is lower.

In some implementations, the central display 300 may be a see-through display and the peripheral display 314 may be a see-through display. For example, such a near-eye display system configuration may be employed in an augmented-reality device. In other implementations, the central display 300 may be an occlusive display and the peripheral display 314 may be a see-through display. For example, such a near-eye display system configuration may be employed in a virtual-reality device. In yet other implementations, the central display 300 may be a see-through display and the peripheral display 314 may be an occlusive display. In other implementations, both displays may be occlusive.

In FIG. 4, a central display 400 and a peripheral display 402 are both coupled to the same waveguide 404. The central display 400 may be coupled to a rear face 406R of the waveguide 404 and the peripheral display 402 may be coupled to a front face 406F of the waveguide 404. A display projector 408 is configured to emit display light in to the waveguide 404. The display projector 408 is coupled operatively to controller 410. The controller 410 controls the display projector 408 to modulate the display light and thereby form the desired central display image. The waveguide 404 includes an entry grating 412 and an exit grating 414. Entry grating 412 is a diffractive structure configured to receive the display light from the display projector 408 and to couple the display light into the waveguide 404. After coupling into the waveguide 404, the display light propagates through the waveguide 404 by TIR from front and rear faces 406 of the waveguide 404. Exit grating 414 is a diffractive structure configured to controllably release the propagating display light from the waveguide 404 in the direction of the user's eye 201 to create the central eyebox. The central display 400 may emit display light through the waveguide to the user's eye 201. In the depicted examples, the entirety of the central eyebox provided by the central display 400 transmits through the waveguide 404 to the user's eye 201.

The waveguide 404 may be curved at a suitable angle such that the horizontal fields of view provided by the central display 400 and the peripheral display 402 overlap. The peripheral display 402 is positioned at least partially in front of the central display 400 and is curved to follow the curvature of the waveguide 404. In other examples, the peripheral display 402 may be flat instead of curved. The peripheral display 402 is see-through such that display light emitted from the central display 400 is transmitted through the waveguide 404 and the peripheral display 402 to the user's eye 201. The peripheral display 402 includes an array of LEDs 416 on a transparent substrate. The LED array 416 may be controlled by the controller 410 to emit display light. An array of reflective lenses may be coupled to the array of LEDs 416 and configured to reflect the display light emitted from the LEDs 416 to toward the user's eye 201 to create a peripheral eyebox. The central display 400 and the peripheral display 402 may be controlled by the controller 410 to cooperatively provide virtual imagery to the user's eye 201. Using a single curved waveguide for the central and peripheral displays in such a near-eye display system configuration may allow for reduced thickness of the near-eye display system and reduced device complexity.

In some implementations, the central display 400 may be configured to creates a central image of a first resolution in a central eyebox and the peripheral display 402 may be configured to create a peripheral image of a second resolution, lower than the first resolution, in a peripheral eyebox, different than the central eyebox. The central image and the peripheral image may form a combined image having a varied resolution that is distributed in a manner that mimics the perceptive field of the human eye.

In some implementations, the central display 400 may be a see-through display and the peripheral display 402 also may be a see-through display. In other implementations, the central display 400 may be an occlusive display and the peripheral display 402 may be a see-through display. In yet other implementations, the central display 400 may be a see-through display and the peripheral display 402 may be an occlusive display. In other implementations, both displays may be occlusive.

Figure 5:
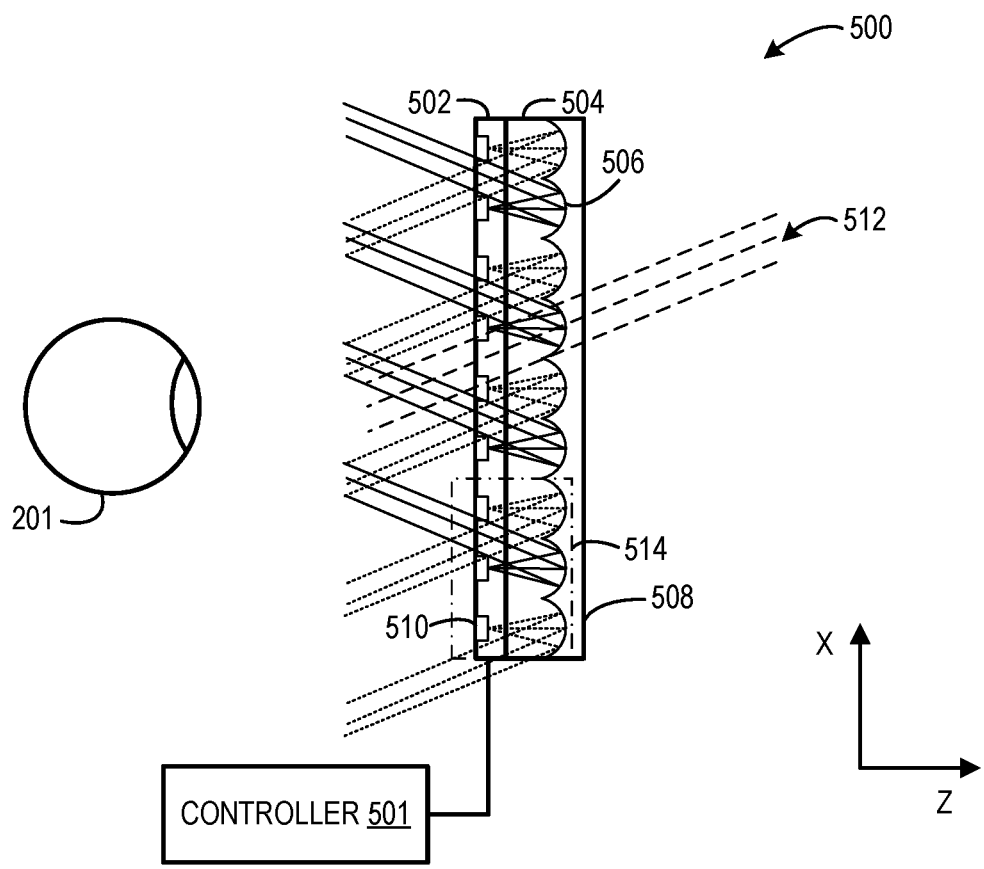
FIG. 5 schematically shows an example near-eye display system.

FIG. 5 show aspects of a near-eye display system 500. For example, the near-eye display system or engine 500 may be implemented in the head-mounted electronic device 102 shown in FIG. 1 as a peripheral display. In other examples, the display system 500 may be implemented as a central display. The display system 500 is operable to position an exit pupil and provide an eyebox in which virtual imagery generated by the display system is viewable by a user's eye 201. As used herein, an "eyebox" refers to a volume of space within which a viewable image is formed and propagated to a human eye pupil from the display system. In practical implementations, an eyebox need not be a plane or rectangle, though it will be described herein as such for the sake of simplicity.

The display system 500 includes a light emitter array 502 on a transparent substrate. The light emitter array 502 may be controlled by the controller 501 to emit display light. The light emitters of the array 502 may comprise light-emitting diodes (LEDs). In one particular example, the LEDs may be organic light-emitting diodes (OLEDs). The light emitter array 502 may be arranged into a plurality of pixels 510. Each pixel may include one or more light emitters of the array 502. The light emitter array 502 may be substantially transparent except for where the pixels 510 are positioned in the array 502.

The light emitter array 502 may be coupled to a micro-lens array (MLA) 504. The MLA 504 may include a number of micro-lenses corresponding to the number of pixels of the light emitter array 502. A partially reflective/transmissive coating 506 may be sandwiched between the MLA 504 and an outer transmissive layer 508. The outer transmissive layer 508 may be index-matched with the coating 506 such that light 512 that is incident on the coating 506 at designated angles (e.g., most angles) may pass through the coating 506 and the micro-lenses of the array 504 may direct the light towards the user's eye 201. As one example where the display system 500 is used as a peripheral display, the light 512 that passes through the outer transmissive layer 508 and through the coating 506 may include display light emitted from a central display. As examples where the display system is implemented in an augmented-reality device having a see-through, near-eye display, the light 512 that passes through the outer transmissive layer 508 and through the coating 506 may include ambient light from the environment. Furthermore, the coating 506 may be configured to reflect display light emitted from the light emitters of the array 502 at designated angles and the micro-lenses of the array 504 may be configured to direct the reflected display light towards the user's eye 201 to form the eyebox. In this way, the display system 500 may act as a reflective display and the array of micro-lenses 504 may act as reflective lenses.

Figure 6:
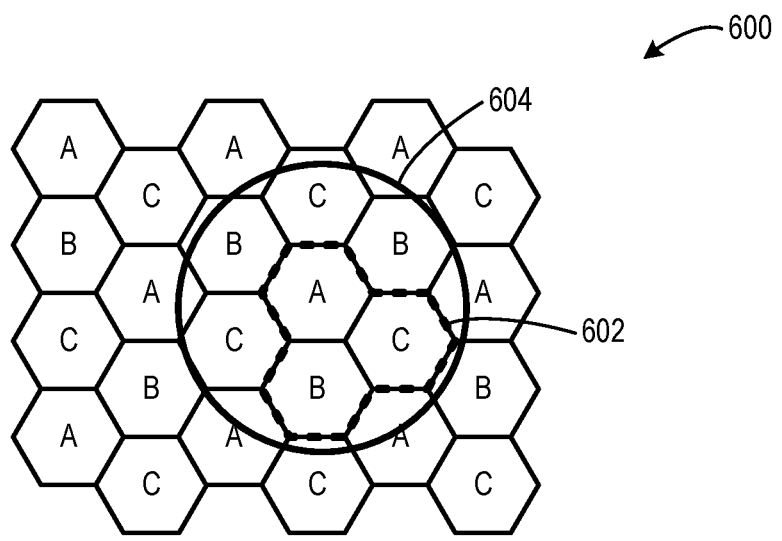
FIG. 6 schematically shows an example arrangement of clusters of micro-lenses of a micro-lens array.

The MLA 504 may be arranged as a plurality of clusters 514 of micro-lenses. In the depicted example, each cluster 514 of the MLA 504 includes two micro-lenses. In other examples, each cluster may include more than two micro-lenses. FIG. 6 schematically shows aspects of an example arrangement 600 of a plurality of clusters 602 of micro-lenses (e.g., micro-lens A, micro-lens B, micro-lens C) that may be implemented in an MLA, such as MLA 504 shown in FIG. 5. Each cluster 602 of micro-lenses may be similar in size or smaller than an average human pupil 604. This ensures that at any point, the user will see all of the different micro-lenses the constitute a cluster (e.g., at least one micro-lens A, at least one micro-lens B, at least one micro-lens C). The small cluster size also allows for the user to perceive uniform intensity across the cluster. Moreover, keeping the size of a cluster small minimizes the visual interference with the perceived view of the user.

Each cluster 602 may form the entire virtual image. Further, each micro-lens within each cluster 602 may be configured to form a different part of the virtual image. For example, micro-lens A may form a first part of the virtual image, micro-lens B may form a second part of the virtual image, and micro-lens C may form a third part of the virtual image such that the cluster of micro-lens A, B, and C cooperatively form the entire virtual image. The plurality of clusters 602 cooperatively form the field of view and the eyebox provided to the user's eye. The clusters may be repeated to increase the eyebox size.

It will be appreciated that the clusters of micro-lenses may have any suitable size and/or shape. Note that the arrangement of the micro-lenses in a cluster and/or the arrangement of the plurality of clusters in the array does not affect a shape of the field of view provided by the plurality of clusters. However, the arrangement of the clusters may affect the occlusion perceived by the user based on the positioning of the pixels. In some examples, a larger number of micro-lenses may be included in each cluster in order to reduce the occlusion to the user's eye.

In some implementations, the array of micro-lenses may include micro-lenses having different optical properties. It will be appreciated that any suitable optical property may differ between different micro-lenses of the array. In some examples, optical properties of different micro-lenses may differ to affect a shape of the field of view. As one example, different micro-lenses may have different levels of tilt to direct reflected light in different directions to form different parts of the field of view. The different micro-lenses having different levels of tilt may be tiled in any suitable manner in the array to form a field of view having any suitable shape and/or size. In some examples, optical properties of different micro-lenses may differ to affect a resolution of the field of view. As one example, different micro-lenses may have different radii of curvature that affect a resolution of the field of view. As another example, one or more micro-lenses of the array may have a variable focal distance and a variable pixel density. In one particular example, each micro-lens of the array may have a variable focal distance and a variable pixel density that allows for variable resolution across the field of view.

Figure 7:
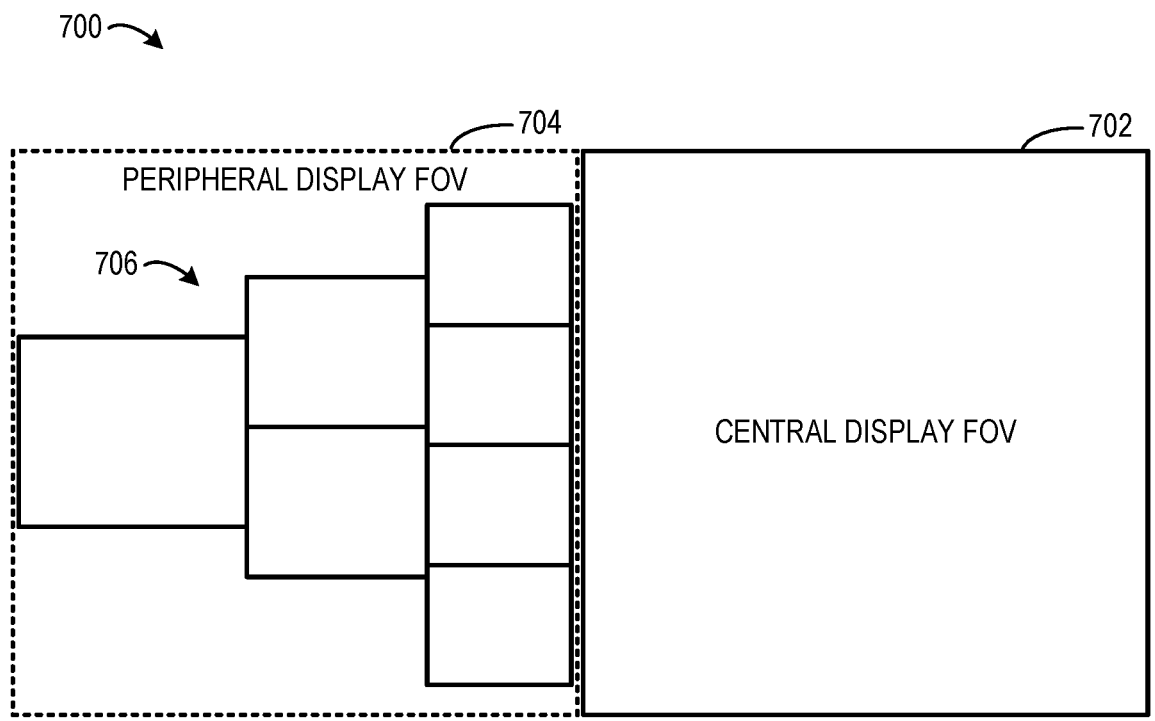
FIG. 7 schematically shows an example field of view of a head-mounted, near-eye display device having varied resolution.

In some implementations, the head-mounted, near-eye display device may be configured to form a combined image having a varied resolution that is distributed in a manner that mimics the perceptive field of the human eye. FIG. 7 schematically shows an example overall field of view 700 having varied resolution. The overall field of view 700 includes a central field of view 702 and a peripheral field of view 704. The central field of view 702 is provided by a central display. The central field of view 702 may have uniform resolution across the field of view. The peripheral field of view 704 is provided by a peripheral display. The peripheral field of view 704 is formed by a plurality of different micro-lenses of a cluster that forms different size regions 706 of the peripheral field of view 704. Each micro-lens can create an arbitrary field of view with arbitrary resolution. In the depicted example, the peripheral field of view 704 is formed from seven different regions 706 having different resolutions. The regions closer to the central field of view 702 are smaller and have higher resolution and the regions further from the central field of view 702 and closer to the periphery of the overall field of view 700 are larger and have lower resolution. In this way, the resolution may be varied across the peripheral field of view 704. In other words, by positioning a higher-resolution image "on-axis" in the central field of view and gradually lowering the resolution of the image moving out towards the periphery of the field of view, the combined image may be perceived by a user as being of higher quality, since the lower-resolution image is positioned where the perceptive power of the eye is lower.

In some implementations, the head-mounted, near-eye display device may be configured to selectively power different portions of the peripheral display based on an eye gaze of the user. As discussed above, in some implementations, the head-mounted, near-eye display device may include a gaze-tracking sensor configured to detect a user's eye gaze position (or other detected eye feature). In some such implementations, the head-mounted, near-eye display device may be configured to determine whether light from different pixels of the peripheral display can be viewed by the user's eye (e.g., enter the pupil of the eye based on a pupil position determined by the gaze tracking sensor). Further, the head-mounted, near-eye display device may be configured to selectively turn off at least some portions of the peripheral display that are not viewable by the user's eye based on the eye gaze detected by the gaze-tracking sensor. Different portions (e.g., pixels) of the peripheral display may be dynamically and selectively powered on/off based on the detected eye gaze position. In this way, the peripheral display may be controlled in a manner that reduces power consumption of the head-mounted, near-eye display device.

Figure 8:
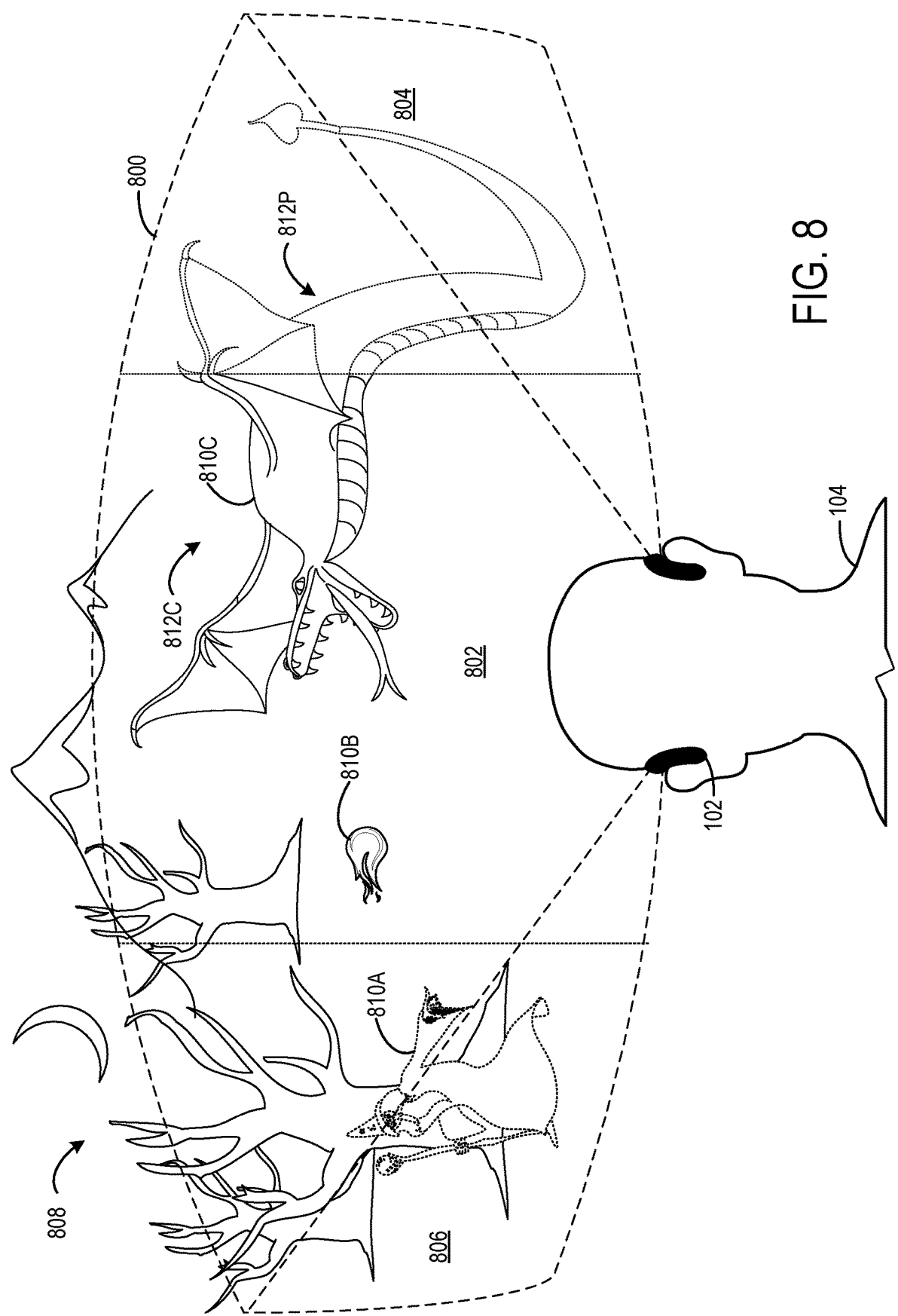
FIG. 8 schematically shows an example view from a perspective of a user of a head-mounted, augmented-reality device including see-through, near-eye central and peripheral displays.

FIG. 8 schematically shows an example view from a perspective of the user 104 wearing the head-mounted electronic device 102. In the depicted example, the device 102 is an augmented-reality device that includes central and peripheral see-through, near-eye displays that cooperatively create an overall field of view 800. In particular, a central display provides a central image in a central field of view 802. A right-side peripheral display provides a right-side peripheral image in a right-side peripheral field of view 804. A left-side peripheral display provides a left-side peripheral image in a left-side peripheral field of view 806. In the depicted example, the different fields of view are demarcated by vertical dotted lines. The central field of view 802, the right-side peripheral field of view 804, and the left-side peripheral field of view 806 collectively form the overall field of view 800. As discussed above, the central field of view optionally may overlap a portion of the peripheral fields of view.

The user 104 may view physical objects 808 in the real-world environment through the overall field of view 800. In the depicted example, the physical objects 808 include trees, mountains, and the moon. Additionally, the central and peripheral displays of the augmented-reality device 102 may be configured to cooperatively present a plurality of virtual objects 810 in the field of view 800. The plurality of virtual objects 810 may be admixed into the user's natural field of view of the physical objects 808 to create an augmented-reality experience. In the depicted example, a virtual wizard 810A is casting a virtual fireball 810B at a virtual dragon 810C. The left-side peripheral display may present the virtual wizard 810A. The central display may present the virtual fireball 810B. The central display and the right-side peripheral display may cooperatively present the virtual dragon 810C. In particular, the central display may present a central portion 812C of the virtual dragon and the right-side peripheral display may present a peripheral portion 812P of the virtual dragon.

In some implementations, the central image presented in the central field of view 802 may have a first resolution and the peripheral images presented in the peripheral fields of view 804 and 806 may have a lower resolutions than the first resolution of the central image. In such implementations, the virtual fireball 810B and the central portion 812C of the virtual dragon may be presented with a higher resolution than the virtual wizard 810A and the peripheral portion 812P of the virtual dragon 810C. However, the combined image may be perceived by the user 104 as being higher quality, since the lower-resolution images are positioned in the periphery where the perceptive power of the user's eyes is lower.

The augmented-reality device 102 may be configured such that when the user's head rotates to view a virtual object that was presented on a peripheral display, the virtual object may move to the central field of view and the virtual object may be presented by the central display. Likewise, when the user's head rotates, a virtual object that was presented by the central display may move to the peripheral field of view and the virtual object may be presented by a peripheral display. In the depicted example, when the user's head rotates to view the virtual wizard 810A, the virtual wizard may move from the left-side field of view 806 to the central field of view 802 and the virtual wizard may be presented by the central display. Further, the virtual dragon 810C may move from the central field of view 802 to the right-side field of view and the virtual dragon may be presented by the right-side peripheral display. Note that in some examples where different fields of view overlap, some virtual objects may be cooperatively presented by multiple displays (e.g., both peripheral and central displays).

To facilitate such virtual motion tracking the device 102 optionally may include a pose sensing system or position-sensing componentry usable to determine the position and orientation of the device 102 in an appropriate frame of reference. In some implementations, the position-sensing componentry returns a six degrees-of-freedom (6DOF) estimate of the three Cartesian coordinates of the display system plus a rotation about each of the three Cartesian axes. To this end, the position-sensing componentry may include any, some, or each of an accelerometer, gyroscope, magnetometer, and global-positioning system (GPS) receiver. The output of the position-sensing componentry may be used to map the position, size, and orientation of virtual display objects (defined globally) onto the central and peripheral displays.

The device 102 optionally may include a world-facing machine vision system comprising a color or monochrome flat-imaging camera and/or a depth-imaging camera. The term 'camera' refers herein to any machine-vision component having at least one optical aperture and sensor array configured to image a scene or subject. The world-facing machine vision system may be configured to acquire optical flow or optic flow data. Optical flow may define a pattern of apparent motion of objects, surfaces, and edges in a visual scene caused by the relative motion between the device 102 and a scene. Such optical flow may be used alone and/or in combination with other sensor data (e.g., accelerometer, magnetometer, gyroscope) to assess the 6DOF pose of the device 102. The device 102 may be further configured to use the optical flow data to map the position, size, and orientation of physical objects in the real-world environment.

Figure 9:
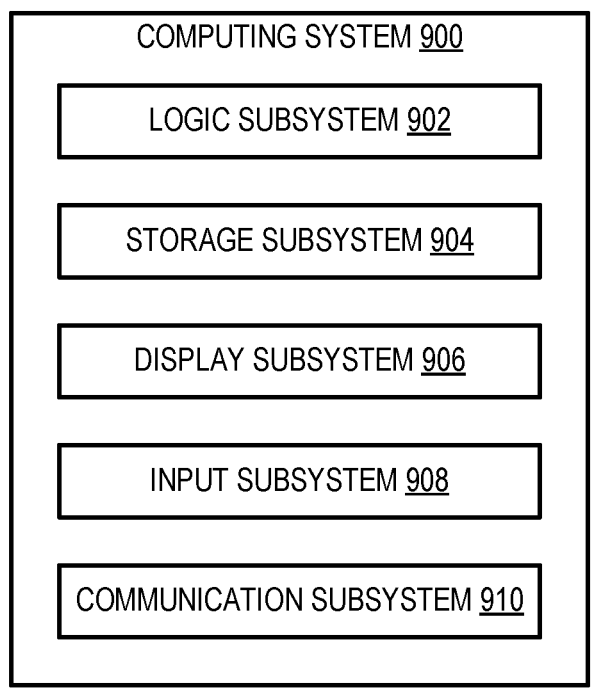
FIG. 9 schematically shows an example computing system.

FIG. 9 schematically shows a simplified representation of a computing system 900 configured to provide any to all of the compute functionality described herein. Computing system 900 may take the form of one or more head-mounted, near-eye display devices, personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 900 may be representative of the head-mounted electronic device 102 in FIG. 1.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem 902 may be configured to execute instructions that are part of one or more applications, services, or other logical constructs. The logic subsystem 902 may include one or more hardware processors configured to execute software instructions. Additionally or alternatively, the logic subsystem 902 may include one or more hardware or firmware devices configured to execute hardware or firmware instructions. Processors of the logic subsystem 902 may be single-core or multi-core, and the instructions executed thereon may be configured for sequential, parallel, and/or distributed processing. Individual components of the logic subsystem 902 optionally may be distributed among two or more separate devices, which may be remotely located and/or configured for coordinated processing. Aspects of the logic subsystem 902 may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem 902. When the storage subsystem 904 includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem 902 executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 902 and the storage subsystem 904 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. As examples, the logic subsystem 902 and the storage subsystem 904 may be implemented as a controller, such as controller 310 shown in FIG. 3, controller 410 shown in FIG. 4, and controller 501 shown in FIG. 5.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays. As examples, display subsystem 906 may be implemented as the near-eye display system 100 shown in FIG. 1, the right-eye, near-eye display system 200R and the left-eye, near-eye display system 200L shown in FIG. 2B, the central display 300 and peripheral display 314 shown in FIG. 3, the central display 400 and the peripheral display 402 shown in FIG. 4, the near-eye display system 500 shown in FIG. 5, and the see-through displays of the head-mounted, near-eye display 102 shown in FIG. 8.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem 910 may be configured for communication via personal-, local- and/or wide-area networks.

In an example, a head-mounted, near-eye display device comprises a see-through central display providing a central horizontal field of view from at least 0° to $C_{max}°$, wherein the see-through central display includes a waveguide transmitting light from a projector, and a see-through peripheral display providing a peripheral horizontal field of view from $P_{min}°$ to $P_{max}°$, wherein $C_{max}°$ is greater than $P_{min}°$ such that the horizontal peripheral field of view overlaps the horizontal central field of view, wherein the see-through peripheral display includes an array of reflective lenses reflecting light from light emitting diodes on a transparent substrate. In this example and/or other examples, the see-through peripheral display may have a lower resolution than the see-through central display. In this example and/or other examples, $C_{max}$ may be at least 20° and $P_{max}$ may be at least 50°.

In an example, a head-mounted, near-eye display device comprises a central display creating a central image of a first resolution in a central eyebox, and a peripheral display creating a peripheral image of a second resolution, lower than the first resolution, in a peripheral eyebox, different than the central eyebox. In this example and/or other examples, the peripheral display may be a see-through display through which light from the central display passes through the peripheral display to reach the central eyebox. In this example and/or other examples, the central display may provide a central horizontal field of view from at least 0° to $C_{max}°$, the peripheral display may provide a peripheral horizontal field of view from $P_{min}°$ to $P_{max}°$, and $C_{max}°$ may be greater than $P_{min}°$ such that the horizontal peripheral field of view overlaps the horizontal central field of view. In this example and/or other examples, $C_{max}°$ may be at least 20° and $P_{max}°$ may be at least 50°. In this example and/or other examples, the central display may be an occlusive display. In this example and/or other examples, the central display may be a see-through display. In this example and/or other examples, the central display may include a waveguide transmitting light through a waveguide. In this example and/or other examples, the peripheral display may be a curved display. In this example and/or other examples, the peripheral display may be a reflective display. In this example and/or other examples, the peripheral display may include an array of reflective lenses. In this example and/or other examples, the peripheral image may be cooperatively formed from a cluster of reflective lenses in the array of reflective lenses. In this example and/or other examples, the cluster of reflective lenses may be one of a plurality of different clusters of reflective lenses, and wherein each cluster forms the peripheral image. In this example and/or other examples, the cluster of reflective lenses may be smaller than an average human pupil. In this example and/or other examples, the array of reflective lenses may include reflective lenses having different optical properties. In this example and/or other examples, the head-mounted, near-eye display device may further comprise a gaze-tracking sensor, and at least portions of the peripheral display may be selectively powered based on an eye gaze detected by the gaze-tracking sensor. In this example and/or other examples, the peripheral display may include light emitting diodes on a transparent substrate.

In an example, a head-mounted, near-eye display device comprises a right-eye central display providing a central horizontal field of view from at least 0° to at least 20°, a see-through, right-eye peripheral display providing a peripheral horizontal field of view from less than 20° to at least 55°, a left-eye central display providing a central horizontal field of view from at least −20° to at least 0°, and a see-through, left-eye peripheral display providing a peripheral horizontal field of view from at least −55° to greater than −20°.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted, near-eye display device, comprising:
   a see-through central display providing a central horizontal field of view from at least 0° to $C_{max}°$, wherein 0° is aligned with an optical axis of a user's eye, and wherein the see-through central display includes a waveguide transmitting light from a projector; and
   a see-through peripheral display providing a peripheral horizontal field of view from $P_{min}°$ to $P_{max}°$, wherein $C_{max}°$ is greater than $P_{min}°$ such that the horizontal peripheral field of view overlaps the horizontal central field of view, wherein the see-through peripheral display includes an array of reflective lenses reflecting light from light emitting diodes on a transparent substrate, wherein light from the projector is transmitted through the waveguide of the see-through central display and a portion of the light transmitted through the waveguide of the see-through central display is transmitted through the transparent substrate of the see-through peripheral display.

2. The head-mounted, near-eye display device of claim 1, wherein the see-through peripheral display has a lower resolution than the see-through central display.

3. The head-mounted, near-eye display device of claim 1, wherein $C_{max}$ is at least 20° and $P_{max}$ is at least 50°.

4. A head-mounted, near-eye display device, comprising:
   a central display creating a central image of a first resolution in a central eyebox; and
   a peripheral display creating a peripheral image of a second resolution, lower than the first resolution, in a peripheral eyebox, different than the central eyebox, wherein the peripheral display is a see-through display through which a portion of light from the central display passes through the peripheral display to reach the central eyebox, such that the central image created in the central eyebox partially overlaps with the peripheral image in the peripheral eyebox.

5. The head-mounted, near-eye display device of claim 4, wherein the central display provides a central horizontal field of view from at least 0° to $C_{max}°$, wherein the peripheral display provides a peripheral horizontal field of view from $P_{min}°$ to $P_{max}°$, and wherein $C_{max}°$ is greater than $P_{min}°$ such that the horizontal peripheral field of view overlaps the horizontal central field of view.

6. The head-mounted, near-eye display device of claim 5, wherein $C_{max}°$ is at least 20° and $P_{max}°$ is at least 50°.

7. The head-mounted, near-eye display device of claim 4, wherein the central display is an occlusive display.

8. The head-mounted, near-eye display device of claim 4, wherein the central display is a see-through display.

9. The head-mounted, near-eye display device of claim 4, wherein the central display includes a waveguide transmitting light through a waveguide.

10. The head-mounted, near-eye display device of claim 4, wherein the peripheral display is a curved display.

11. The head-mounted, near-eye display device of claim 4, wherein the peripheral display is a reflective display.

12. The head-mounted, near-eye display device of claim 11, wherein the peripheral display includes an array of reflective lenses.

13. The head-mounted, near-eye display device of claim 12, wherein the peripheral image is cooperatively formed from a cluster of reflective lenses in the array of reflective lenses.

14. The head-mounted, near-eye display device of claim 13, wherein the cluster of reflective lenses is one of a plurality of different clusters of reflective lenses, and wherein each cluster forms the peripheral image.

15. The head-mounted, near-eye display device of claim 13, wherein the cluster of reflective lenses is smaller than an average human pupil.

16. The head-mounted, near-eye display device of claim 12, wherein the array of reflective lenses includes reflective lenses having different optical properties.

17. The head-mounted, near-eye display device of claim 4, further comprising a gaze-tracking sensor, wherein at least portions of the peripheral display are selectively powered based on an eye gaze detected by the gaze-tracking sensor.

18. The head-mounted, near-eye display device of claim 4, wherein the peripheral display includes light emitting diodes on a transparent substrate.

19. A head-mounted, near-eye display device, comprising:
a right-eye central display providing a central horizontal field of view from at least 0° to at least 20°, wherein 0° is aligned with an optical axis of a user's right eye;
a see-through, right-eye peripheral display providing a peripheral horizontal field of view from less than 20° to at least 55°, wherein light is transmitted through a right-eye waveguide of the right-eye central display and a portion of the light transmitted through the right-eye waveguide of the right-eye central display is transmitted through a right-eye transparent substrate of the see-through, right-eye peripheral display;
a left-eye central display providing a central horizontal field of view from at least −20° to at least 0°, wherein 0° is aligned with an optical axis of a user's left eye; and
a see-through, left-eye peripheral display providing a peripheral horizontal field of view from at least −55° to greater than −20°, wherein light is transmitted through a left-eye waveguide of the left-eye central display and a portion of the light transmitted through the left-eye waveguide of the left-eye central display is transmitted through a left-eye transparent substrate of the see-through, left-eye peripheral display.

\* \* \* \* \*